United States Patent [19]

Linder et al.

[11] Patent Number: 4,856,482
[45] Date of Patent: Aug. 15, 1989

[54] METHOD OF CONTROLLING THE DEMAGNETIZATION PHASE OF ELECTROMAGNETIC DEVICES, ESPECIALLY OF ELECTROMAGNETIC VALVES OF COMBUSTION ENGINES

[75] Inventors: Ernst Linder, Mühlacker; Helmut Rembold, Stuttgart; Walter Teegen, Waiblingen, all of Fed. Rep. of Germany

[73] Assignee: Robert Bosch GmbH, Stuttgart, Fed. Rep. of Germany

[21] Appl. No.: 142,862

[22] PCT Filed: Nov. 6, 1986

[86] PCT No.: PCT/DE86/00451
§ 371 Date: Nov. 6, 1987
§ 102(e) Date: Nov. 6, 1987

[87] PCT Pub. No.: WO87/05662
PCT Pub. Date: Sep. 24, 1987

[30] Foreign Application Priority Data

Mar. 21, 1986 [DE] Fed. Rep. of Germany ....... 3609599

[51] Int. Cl.$^4$ ............................................. F02M 39/00
[52] U.S. Cl. .................................... 123/506; 123/494; 123/500; 251/129.1
[58] Field of Search ............... 123/506, 458, 494, 500, 123/501, 503; 251/129.09, 129.1

[56] References Cited

U.S. PATENT DOCUMENTS

| | | | |
|---|---|---|---|
| 3,942,485 | 3/1976 | Suda | 251/129.09 |
| 3,982,505 | 9/1976 | Rivere | 123/506 |
| 4,112,477 | 9/1978 | Sherwin | 123/506 |
| 4,392,632 | 7/1983 | Gast | 251/129.1 |
| 4,718,391 | 1/1988 | Rembold | 123/494 |
| 4,727,835 | 3/1988 | Kobayashi | 123/506 |

FOREIGN PATENT DOCUMENTS

| | | | |
|---|---|---|---|
| 2248457 | 5/1975 | France | 123/506 |
| 2025183 | 1/1980 | United Kingdom | 123/506 |
| 2132706 | 7/1984 | United Kingdom | 123/506 |

Primary Examiner—Carl Stuart Miller
Attorney, Agent, or Firm—Michael J. Striker

[57] ABSTRACT

In a method for controlling the demagnetization phase of electromagnetic devices, particularly electromagnetic valves in combustion engines, the exciting current $i = i(t)$, starting from a high holding current value, is decreased not to zero or even to a negative value, but to a value in the positive range below the holding current. Because of the characteristic current and/or voltage values which accordingly occur in the excitation circuit, the start of the opening and the end of the opening of the valve needle of the electromagnetic valve can be determined in a particularly precise manner and can be taken into account for an optimal influencing of the manner of operation of the combustion engine (FIG. 3).

8 Claims, 6 Drawing Sheets

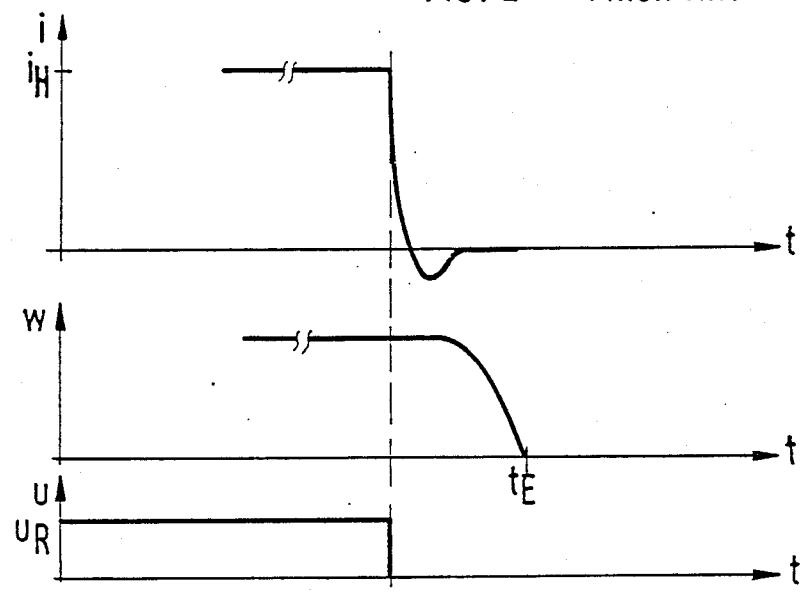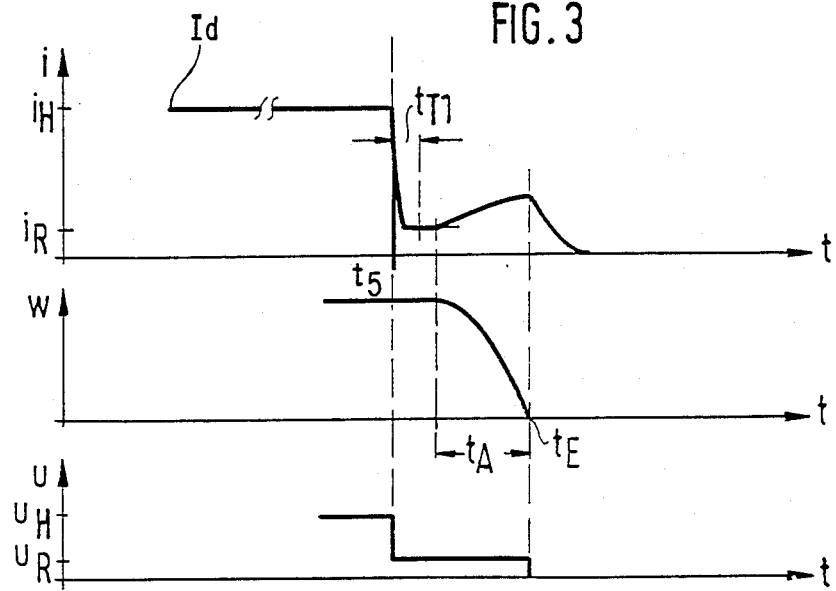

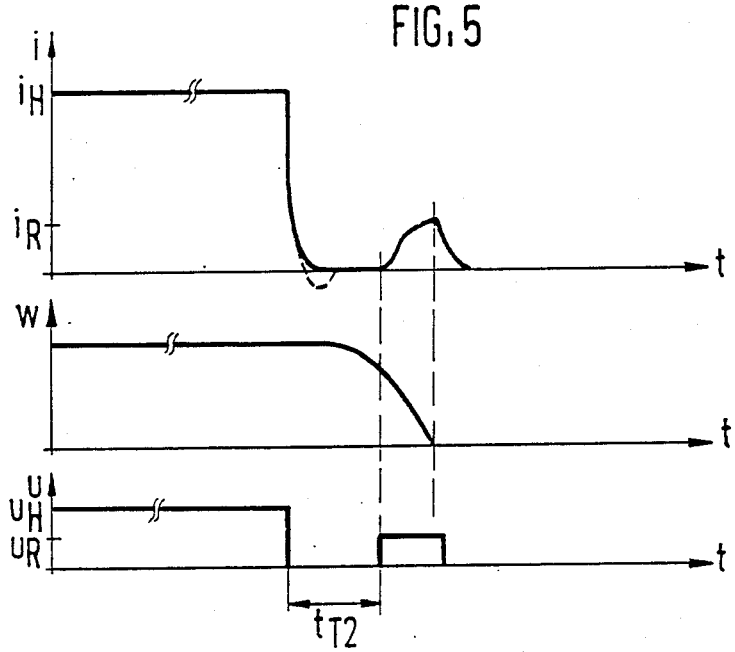
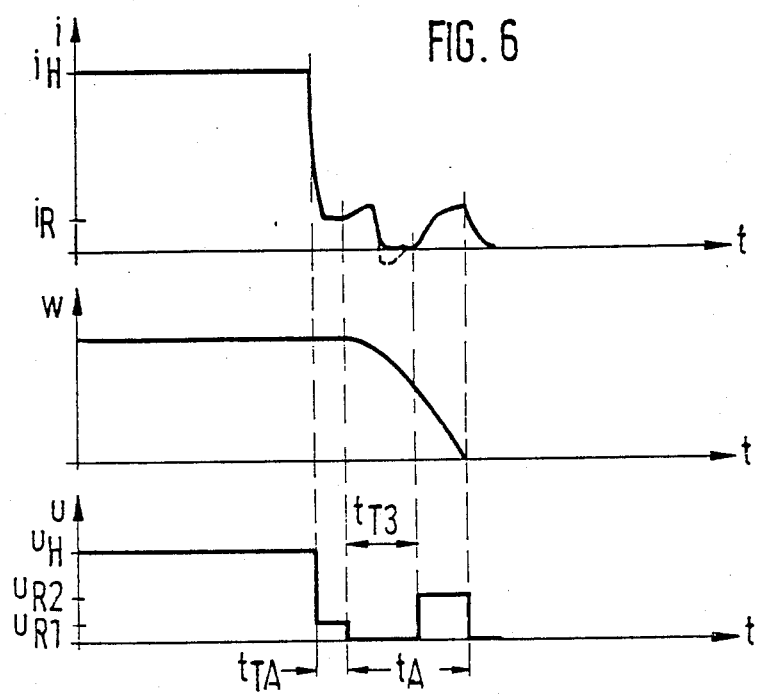

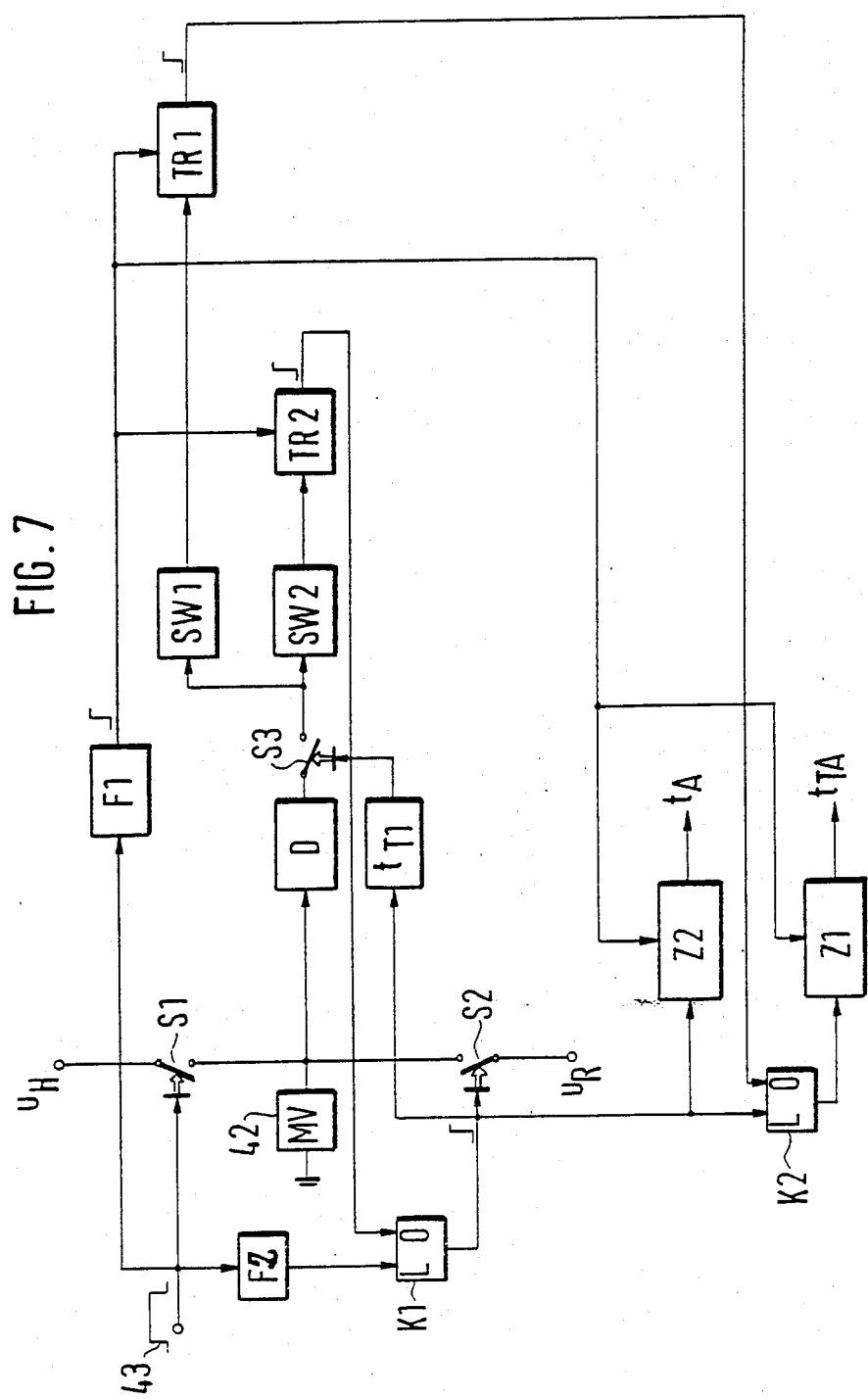

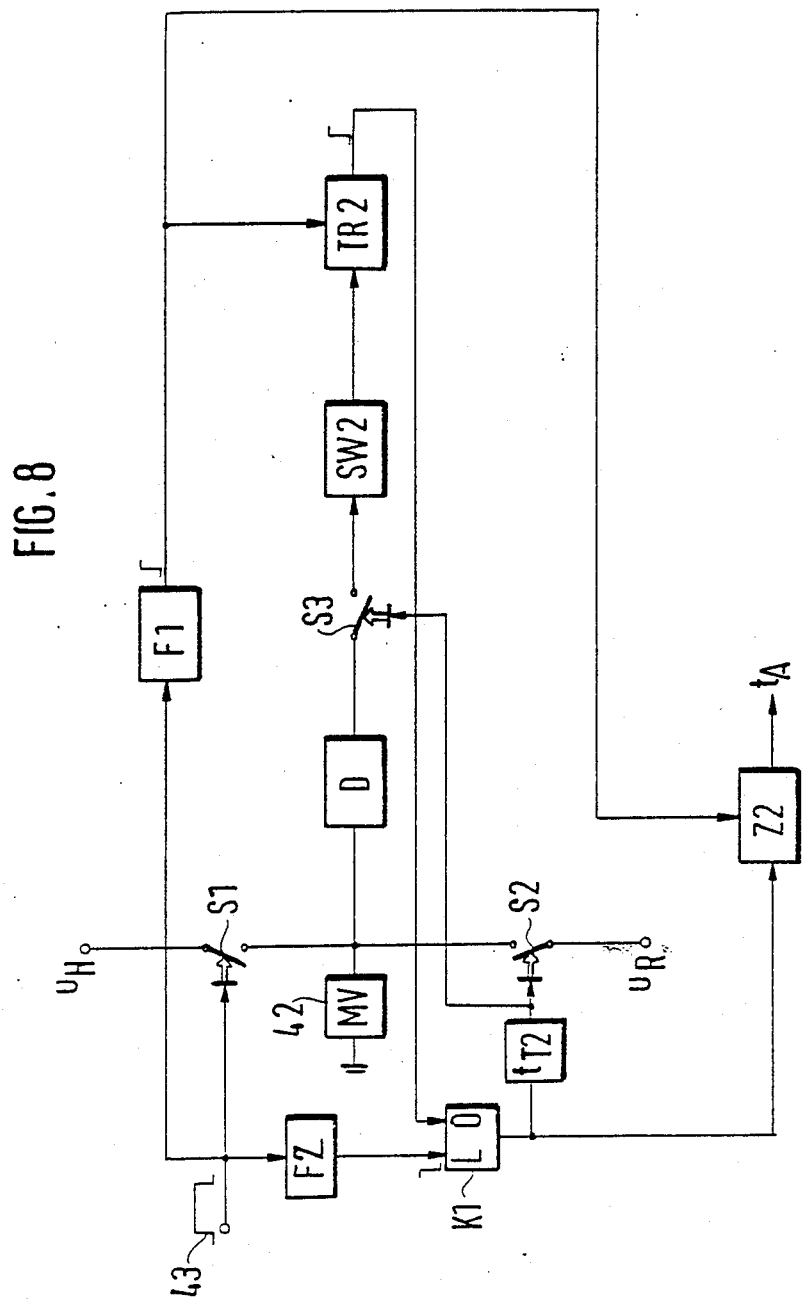

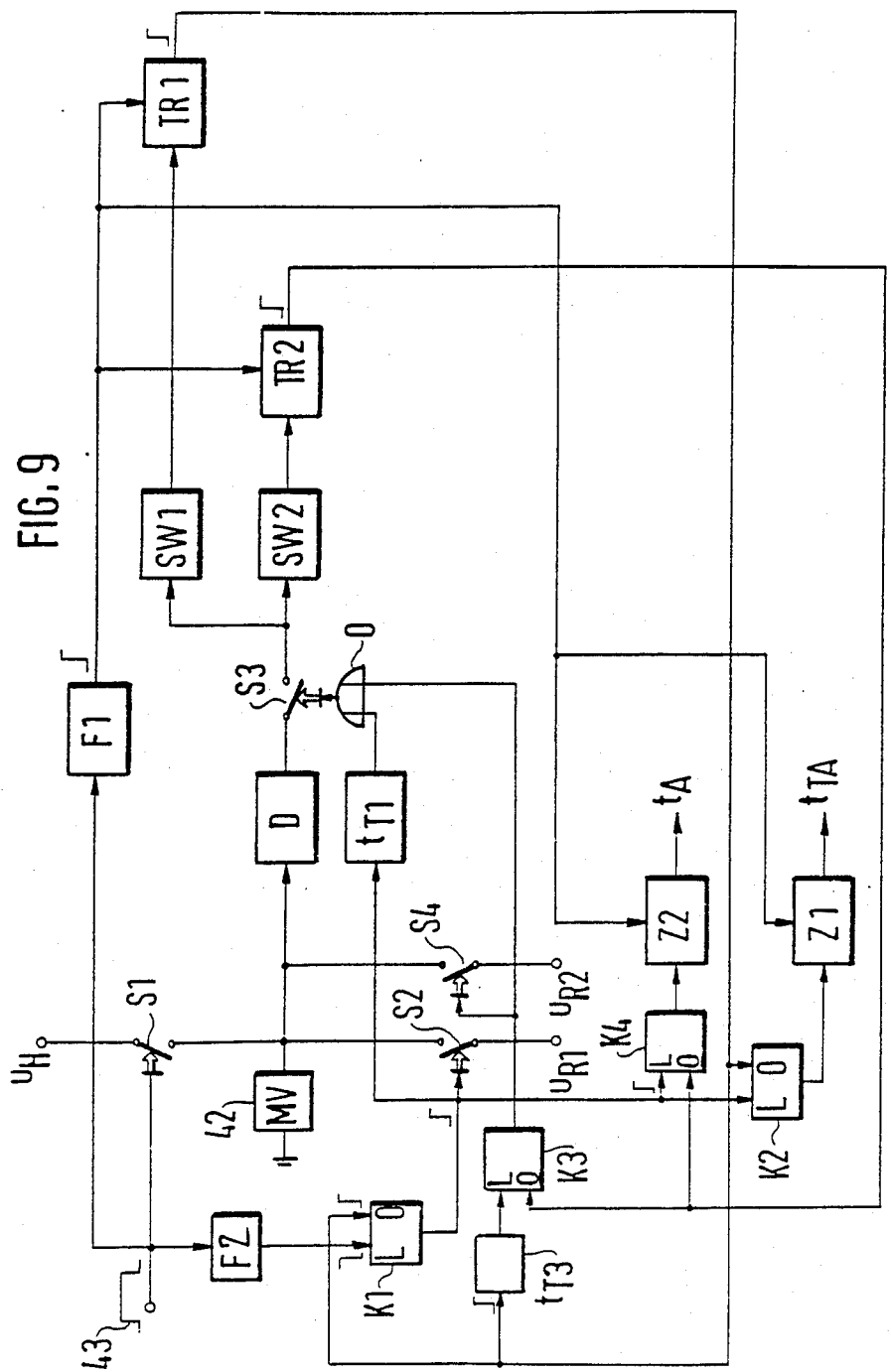

METHOD OF CONTROLLING THE DEMAGNETIZATION PHASE OF ELECTROMAGNETIC DEVICES, ESPECIALLY OF ELECTROMAGNETIC VALVES OF COMBUSTION ENGINES

PRIOR ART

In fast-acting solenoid valves, which are used, for example, for controlling diesel injection pumps, it is necessary to keep the opening and closing times and the end of the opening of tee valve needle as accurate as possible in order to determine the quantity of fuel that is supplied as precisely as possible. In order to achieve particularly short switch-off times (opening), the exciting current of the electromagnetically actuated valve is decreased as quickly as possible starting from the holding current value and is even briefly forced into the negative area in order to overcome the disadvantageous magnetic adhering. Recognizing the closing time from the current and/or voltage curves on the excited valve is relatively simple, since, in this case, a great change in speed of the valve needle occurs with a relatively small air gap and strong excitation of the magnetic circuit, which results in a change in induction which can be evaluated in a reliable manner. On the other hand, the evaluation of the opening process is substantially less reliable, since a stop results when there is a large air gap, and the excitation is substantially smaller because of the current reduction. In very fast-acting valves, the exciting current is often reduced to zero already before, or at the latest during, the needle movement, so that an evaluation of the opening process with the aid of characteristic current and voltage values is no longer possible at all.

ADVANTAGES OF THE INVENTION

In contrast, the method according to the invention, with the characterizing features of the main claim, has the advantage that the switch-off behavior of the electromagnetic valve can also be determined in a simple manner by means of the characteristic current or voltage curve so that the functioning of the combustion engine can be controlled in a more precise way.

Developments of the method and of circuit arrangements for implementing the method are indicated in the subclaims.

DRAWING

The method and circuit arrangements suitable for implementing the method are shown in a simplified manner with the aid of the drawing and are explained in more detail in the following description.

FIG. 2 shows a diagram showing exciting current, exciting voltage and the path of the valve needle with conventional controlling of a valve;

FIG. 3 shows a diagram which shows the exciting current, the path of the valve needle and the curve of the exciting voltage, as a function of time in each instance, with the use of the method according to the invention;

FIGS. 5 and 6 show additional diagrams of the type described more closely in the context of FIG. 3 in order to explain developments of the invention;

and FIGS. 7, 8 and 9 each show a circuit arrangement for implementing the method according to the invention.

DESCRIPTION OF THE EMBODIMENT EXAMPLE

Figure 1:
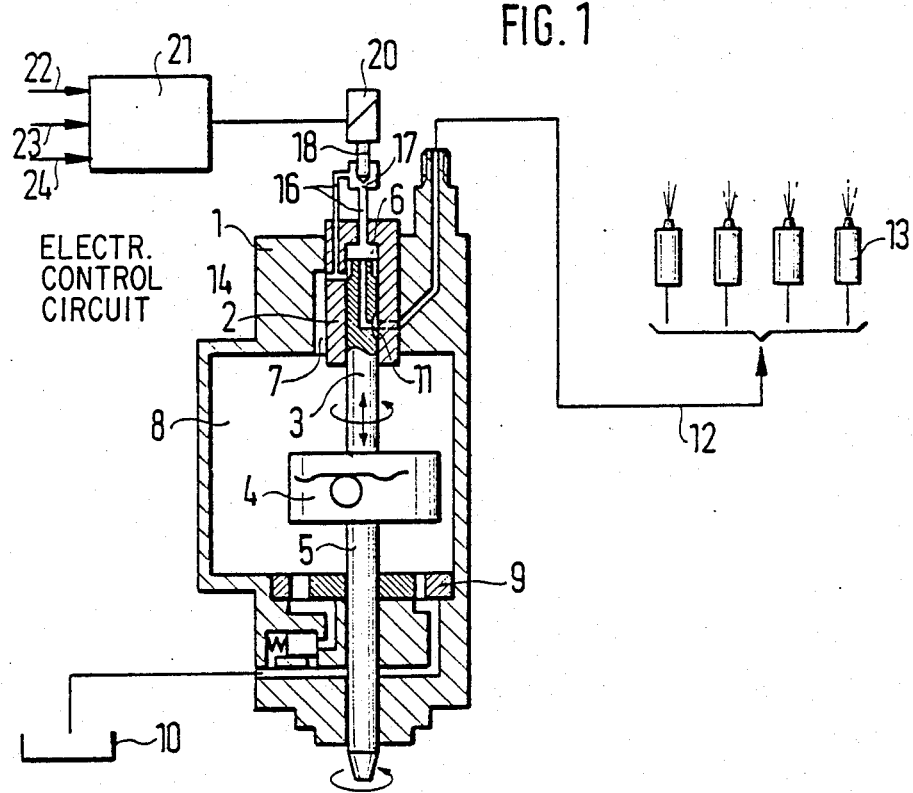
FIG. 1 shows a fuel injection pump in a simplified presentation.

In the fuel injection pump shown in FIG. 1, for example, a bush 2 is arranged in a housing 1, a pump plunger 3 executes a reciprocating and simultaneously rotating motion in this bush 2. The pump plunger 3 is driven by means of a cam drive 4 via a shaft 5 which rotates synchronously with the rate of rotation of the combustion engine provided with fuel by the injection pump. The front face of the pump plunger 3 and the bush 2 define a pump work space 6 which is connected with an inlet chamber or suction space 8 in the housing 1 of the fuel injection pump via a supply duct 7. The suction space 8 is supplied with fuel from a fuel container 10, for example, by means of a delivery pump 9. The fuel is distributed via pressure lines 12 from the pump work space 6 via an elongated distributor groove 11 of the pump plunger 3 when the pump plunger 3 is in the corresponding rotational position; the pressure lines 12 lead to injection nozzles 13 at the combustion engine via the bush 2 and the housing 1. A discharge duct 16 branches from the pump work space 6 at a place which cannot be influenced by means of the pump plunger 3 and is guided on the suction side of the pump plunger 3 and opens into the supply duct 7, for example. A valve seat 17 is located in the discharge duct. A valve needle 18, which serves as a portion of an electromagnetically actuable control device 20, particularly of an electromagnetic valve, and opens or closes the cross section of the discharge duct according to the control, cooperates with the valve seat 17. The control device 20 is controlled by means of an electronic control device 21 as a function of various operating parameters of the combustion engine, such as load 22, rate of rotation 23, temperature 24, etc. The commencement and conclusion of the fuel delivery by means of the fuel pump is determined in a known manner by means of the control device 20 during the delivery stroke of the pump plunger 3. In the nonexcited state of the control device 20, the valve needle 18 is lifted from the valve seat, for example, and the discharge duct 16 is accordingly opened so that no pressure sufficient for opening the injection nozzles 13 can build up in the pump work space 6. The valve needle 18 is moved toward the valve seat 17 by means of the excitation of the control device 20 and closes it. A pressure then builds up in the pump work space 6 and fuel arrives in the injection nozzles 13 via the distributor groove 11. The demagnetization of the control device 20 is equivalent to the end of delivery, since the valve seat 17 is accordingly completely opened again and a drop in pressure occurs in the pump work space.

Each of the diagrams shown in FIGS. 2, 3, 5 and 6 shows the time slope of exciting current i, exciting voltage u, as well as the path w of the valve needle 18 of the electromagnetic valve, in section, i.e. only over a determined time interval. The diagram according to FIG. 2 shows these values in the conventional method for the control of the demagnetization period. It clearly follows from the presentation of the current curve i=i (t) that the exciting current is first adjusted to a relatively high value corresponding to the holding current $i_H$, but is then reduced very quickly in a steep curve course in order to achieve shorter switch-off times (opening) and is even forced into the negative area for a brief period in order to reduce the magnetic adherence.

The lower portion of the diagram according to FIG. 2 shows the corresponding exciting voltage $u = u(t)$. The middle area of the diagram according to FIG. 2 also shows the path of the valve needle 18 as a function of time t. A comparison of the current curve $i = i(t)$ with the path curve shown in the middle area of the diagram according to FIG. 2 clearly shows that the current i proceeding from the holding current $i_H$ has already been reduced to zero prior to the beginning of the opening of the valve needle. Therefore, it is no longer possible to monitor the opening process, for example, by means of characteristic current and/or voltage values in the area of the electromagnetic valve.

The diagram of FIG. 3 helps to explain the corresponding curves in the use of the method according to the invention. The presentation of the exciting current $i = i(t)$ in the upper area of FIG. 3 shows that the current i is decreased very sharply in a steep curve proceeding from the relatively high level of the holding current $i_H$, but only to a current $i_R$ which is not zero and is still in the positive range, this current $i_R$ being maintained for a period of time $t_{T1}$. The value of the current $i_R$ is selected so as to be low in such a way that the resulting magnetic force is less than the pressure force acting on the valve needle. However, because of the constant residual excitation which is predetermined by means of the current $i_R$, a corresponding change in current occurs by means of the mutual induction during the movement of the valve needle, from which current change the start and end of the opening can be determined in a relatively simple manner by means of differentiation. Alternately, the occurring change in voltage can also be evaluated when there is a load-independent current. However, a presupposition for the recognition of the start of the opening of the valve needle according to the previously described manner is that the current i already be reduced to a lower level $i_R$ at this point in time. This can easily be accomplished in practice, since the reduction of the magnetic force follows the reduction of the current only after a delay because of the influence of eddy currents. Only after reaching the end of the opening, that is, after time point $t_E$, is the current i finally reduced to zero.

The voltage curve $u = u(t)$ for this embodiment example is shown again in the lower diagram of FIG. 3.

The method according to the invention, which is described above, leads to a slight prolongation of the opening time, which, however, can be managed easily in practice, since straying and drift influences occurring because of the precise recognition of the opening process according to the method, according to the invention, can be compensated in a simple manner. However, if the slight prolongation of the opening duration is to be avoided occasionally when there are particularly high requirements concerning the precision, this can be achieved in a simple manner by means of an advantageous construction of the invention. This is explained by means of the diagram of FIG. 5. According to the upper diagram of FIG. 5, the current $i = i(t)$ for starting the opening process of the valve needle is reduced very rapidly to zero or even briefly reversed into the negative area in order to be raised again to a determined positive value $i_R$ while the valve needle 18 has already begun moving. Since the current i is raised to a value $i_R$ at a point in time during which the speed of the valve needle and the air gap are already relatively great, the influence of this step on the opening time is negligible. The precise evaluation of the end of the opening is effected in the manner already described. An even stronger residual excitation can now be selected by means of the delayed increase of the current i to the value $i_R$, which residual excitation advantageously leads in turn to a larger useful signal capable of evaluation. In the latter embodiment example of the invention, only one evaluation of the end of the opening of the valve needle takes place.

In the event that a precise evaluation of the start of the opening of the valve needle is desirable in certain cases of use, there is another development of the method, according to the invention, which is explained with the aid of the diagrams of FIG. 6.

The difference with respect to the previously described embodiment example consists substantially in that the current $i = i(t)$ is first lowered as quickly as possible to a determined positive residual value $i_R$ starting from the level of the holding current $i_H$, as in the embodiment example according to FIG. 3; it is held at this level for a period of time, then lowered to zero or in the negative range, and finally increased again to a higher positive value, e.g. the level of i. These steps ensure that changes in current and/or voltage which are subject to an easy evaluation, occur at the excitation coil of the electromagnetic device.

Figure 4:
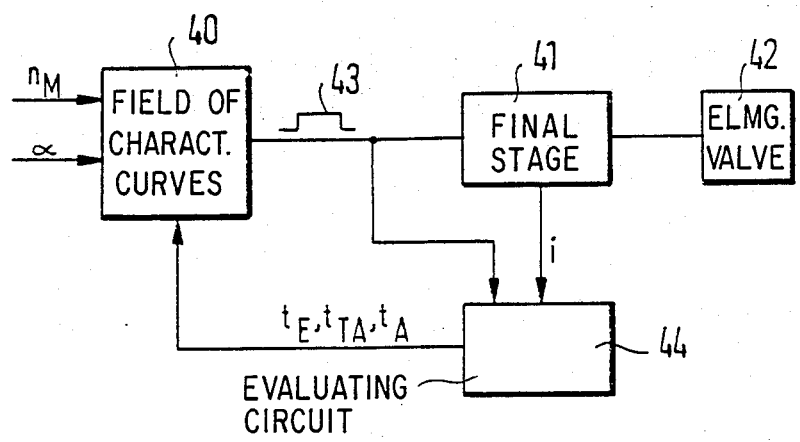
FIG. 4 shows a block wiring diagram of a circuit arrangement for implementing the method according to the invention.

A device for implementing the method, according to the invention, is shown schematically in FIG. 4 in the form of a block wiring diagram. The electromagnetic valve 42 is controlled by means of a field of characteristic curves 40 and a final stage 41. An evaluating circuit 44, which detects both the closing movement and the opening movement of the electromagnetic valve 42, is activated simultaneously by means of the, control signal 43 supplied to the final stage 41 from the field of characteristic curves 40. Corresponding to the positive or negative edge of the signal, it is possible to assign either the closing or the opening process. It is particularly advisable that an activation of the evaluating circuit 44 be effected only within a time window, which can be predetermined in an arbitrary manner, in order to reduce interference influences. The values $t_E$, $t_{TA}$ and $t_A$ evaluated in the evaluating circuit 44 are fed to the field of characteristic curves 40 and compared with desired values stored in that location. When deviations from the desired values are determined, the opening duration of the electromagnetic valve 42 is correspondingly corrected via the final stage 41 in order to precisely measure the supplied volume of fuel. In this instance, $t_{TA}$ designates the switch-off dead-time, that is, the period of time from the switch-off pulse edge until the start of the opening of the valve needle; $t_A$ designates the switch-off time, that is, the time from the switch-off pulse edge until the end of the opening of the valve needle, and $t_E$ designates the switch-on time, i.e. the time period from the switch-on pulse edge to the closing time of the valve needle.

FIGS. 7, 8, and 9 show circuit arrangements for implementing the method, according to the invention. The circuit arrangement according to FIG. 7 enables a control of the electromagnetic valve 42 (MV) corresponding to the method explained according to FIG. 3. The switch S1 is closed for the duration of the control pulse by means of the control pulse 43 transmitted from the characteristic diagram 40. The voltage $U_H$ is accordingly applied to the electromagnetic valve 42 so that the latter is acted upon by the holding current $i_H$. The zero setting of the Schmitt triggers TR1 and TR2 and the counters Z1 and Z2 is effected simultaneously by means of the leading edge of the control pulse 43. A filter F1 prevents the switch-off edge of the control pulse 43 from affecting TR1 and TR2 or the counters Z1 and Z2. Another filter F2 suppresses the leading edge of the control pulse 43 and only allows the switch-off edge of the control pulse 43 to pass, which control pulse 43 sets the bistable flipflop connection K1. The output signal of the bistable flipflop connection K1 closes the switch S2 and applies the voltage $u_R$ (residual exciting voltage) to the electromagnetic valve 42 which is now acted upon by the residual exciting current $i_R$. A switch S3 is activated at the same time as the counters Z1 and Z2, which are activated by means of another bistable flipflop connection K2. Switch S3 only responds after a predeterminable dead time $t_{T1}$. This dead time is selected in such a way that the residual exciting current $i_R$ has reached a stationary value after its expiration. The current $i=i(t)$, which acts upon the solenoid valve 42, is differentiated by means of a differentiator D. A positive threshold value at the threshold value switch SW1, which results from this, activates the Schmitt trigger TR1, which leads to a resetting of the bistable flipflop connection K2 and to a stopping of the counter Z1. This counter Z1 determines the switch-off dead time $t_{TA}$, that is, the period of time which elapses from the switch-off pulse edge to the start of the opening of the valve needle 18. If a negative threshold value occurs at the threshold value switch SW2 from the differentiated current of the electromagnetic valve 42, the Schmitt trigger TR2 is activated and, in turn, resets the bistable flipflop connection K1 and accordingly stops the counter Z2. Counter Z2 shows the switch-off time $t_4$. Switch S2 is opened simultaneously and the electromagnetic valve 42 is accordingly excited.

The circuit arrangement according to FIG. 8 is suitable for implementing the method which was explained in the preceding with the aid of the diagram from FIG. 5. In contrast to the manner of operation of the previously described circuit arrangement according to FIG. 7, only the time $t_4$ is now evaluated. The residual exciting voltage $u_R$ is fed to the electromagnetic valve 42 via the switch S2 only after the expiration of time interval $t_{T2}$. The current of the electromagnetic valve 42, which is differentiated by the differentiator D, is also fed via the switch S3 to the elements of the evaluating circuit, namely the threshold value switch SW2, the Schmitt trigger TR2, the bistable flipflop connection K1, and the counter Z2, only after the time $t_{T2}$ has elapsed.

The circuit arrangement according to FIG. 9 enables the implementation of the method which is described with the aid of the diagram of FIG. 6. The determination of $t_{TA}$ runs substantially in correspondence to the circuit arrangement according to FIG. 7. Only the resetting of the bistable flipflop connection K1 is now effected via the Schmitt trigger TR1. Another bistable flipflop connection K3, which closes switch S3 again by means of the OR gate 0 and applies the residual exciting voltage $U_{R2}$ to the electromagnetic valve 42 via the switch S4, is set with the reset pulse after a delay time $t_{T3}$ has elapsed. In order that the counter Z2 not be stopped when the first residual exciting voltage $u_{R1}$ is switched off by means of the resetting of the bistable flipflop connection K1, a decoupling is provided by means of another bistable flipflop connection K4. The bistable flipflop connections K4 and K3 are reset again after the Schmitt trigger TR2 responds.

We claim:

1. Method for controlling the demagnetization phase of electromagnetic devices, particularly of electromagnetic valves in combustion engines, characterized in that the exciting current of the electromagnetic device, proceeding from a high value corresponding to the holding current, is decreased, at least temporarily, to a lower, but positive, value below the holding current level for the duration of a time interval provided for the opening of the valve, the exciting current being decreased to a lower value for the duration of a switch-off dead time, wherein the time period between the switch-off pulse edge and the start of the opening of the valve needle of the valve is defined as the switch-off dead time.

2. Method for controlling the demagnetization phase of electromagnetic devices, particularly of electromagnetic valves in combustion engines, characterized in that the exciting current of the electromagnetic device, proceeding from a high value corresponding to the holding current, is decreased, at least temporarily, to a lower, but positive, value below the holding current level for the duration of a time interval provided for the opening of the valve, whereby the exciting current, starting from the level of the holding current, is first decreased to a lower positive value and is kept substantially at this level during a second time interval, and then 3. Method for controlling the demagnetization phase of electromagnetic devices, particularly of electromagnetic valves in combustion engines, characterized in that the exciting current of the electromagnetic device, proceeding from a high value corresponding to the holding current, is decreased, at least temporarily, to a lower, but positive, value below the holding current level for the duration of a time interval provided for the opening of the valve, the current values associated with the characteristic points of a distance curve ($w=w(t)$) of the valve needle, which current values occur during the control of the electromagnetic valve by means of a final stage, are led to an evaluating circuit which determines characteristic points of the distance curve ($w=w(t)$) of the valve needle from the current values fed to it and feeds the determined values to a circuit storing a set of characteristic curves for comparison with the desired values stored there decreased and increased again to a positive value below the holding current level during a fourth time interval.

4. A circuit arrangement for controlling the demagnetization phase of electromagnetic devices, particularly of electromagnetic valves in combustion engines, characterized in that it comprises a field of characteristic curves in which are stored the predetermined desired values of characteristic points of a distance curve of the valve needle of the electromagnetic valve and which transmits a control signal as a function of detected operating parameters of the combustion engine, which control signal is fed to a final stage which excites the electromagnetic valve, and in that an evaluating circuit is provided which detects current values occurring during the excitation or demagnetization of the electromagnetic valve, determines characteristic values of the distance curve of the valve needle from them, and feeds them to the field of characteristic curves for the purpose of comparison with the stored desired values.

5. Circuit arrangement according to claim 4, characterized in that the evaluating circuit is connected with the field of characteristic curves in such a way that the control signal transmitted by the field of characteristic curves for the purpose of controlling the final stage is fed to the evaluating circuit, specifically in such a way that the evaluating circuit can preferably be activated only during a predeterminable time window.

6. Circuit arrangement according to claim 4, characterized through a first filter (F1), which only conducts the leading edge of the control pulse (43) for the electromagnetic valve (42) for setting two Schmitt triggers (TR1, TR2) and two counters (Z1, Z2) to zero, and a second filter (F2), which only conducts the trailing edge of the control pulse (43) to a first bistable flipflop connection (K1), whose output signal applies the residual exciting voltage ($u_R$) to the electromagnetic valve (42) by means of a switch (S2) on the one hand, and, on the other hand, starts the first counter (Z2)—for determining the time ($t_A$)—and, directly via the second bistable flipflop connection (K2), starts the first counter (Z1)—for determining the time ($t_{TA}$)—and, finally, after a time delay (dead time $t_{T1}$), feeds the differentiated current values of the electromagnetic valve (42) to a first threshold value switch (SW1) and a second threshold value switch (SW2) via a switch (S3), a Schmitt trigger (TR1) and (TR2) being connected downstream of the first and second threshold value switches (SW1) and (SW2), respectively, the output signals of the Schmitt triggers (TR1) and (TR2) reset the first bistable flipflop connection (K1) or the second bistable flipflop connection (K2).

7. Circuit arrangement according to claim 4, characterized through a filter circuit (F1) and (F2) for separating the leading the trailing edges of the control pulse (43) for the control of the electromagnetic valve (42), through a Schmitt trigger (TR2) and a counter (Z2), to which the leading edge of the control pulse (43) separated by the filter (F1) is fed for the purpose of resetting, and a bistable flipflop connection (K1) which is acted upon by the trailing edge of the control pulse (43) via filter (F2) and which acts upon the electromagnetic valve (42) via a switch (S2) with the residual exciting voltage ($u_R$) in a time-delayed manner (dead time $t_{T2}$) on the one hand and on a threshold value switch (SW2), followed by the Schmitt trigger (TR2), with the differentiated current of the control current of the electromagnetic valve (42) by means of the actuation of another switch (S3) on the other hand, wherein the output signal of the Schmitt trigger (TR2) is returned to the resetting input of the bistable flipflop connection (K1) for the purpose of resetting the Schmitt trigger (TR2).

8. Circuit arrangement according to claim 4, characterized in that three voltage sources with voltage values ($h_H$, $u_{R1}$, $u_{R2}$) are provided controlling the electromagnetic valve (42), wherein the first voltage source (voltage value $u_H$) can be applied to the electromagnet valve (42) directly by means of the control pulse (43) and via a first switch (S1) during the duration of this control pulse (43), while a bistable flipflop connection (K1), which can be actuated by the trailing edge of the control pulse (43) and closes a second switch (S2), is provided for connecting the electromagnetic valve (43) with the second voltage source (voltage value $u_{R1}$), and wherein another bistable flipflop connection (K3) is provided for the connection of the electromagnetic valve (42) to the third voltage source (voltage value $u_{R2}$) via a third switch (S4); after the first bistable flipflop connection (K1) is reset by means of an output signal of the Schmitt trigger (TR1) following the threshold value switch (SW1), the other bistable flipflop connection (K3) is set by means of a signal which is identical except that it is fed in a time-delayed manner (delay time $t_{T3}$) and, in so doing, closes the switch (S4).

* * * * *